UNITED STATES PATENT OFFICE.

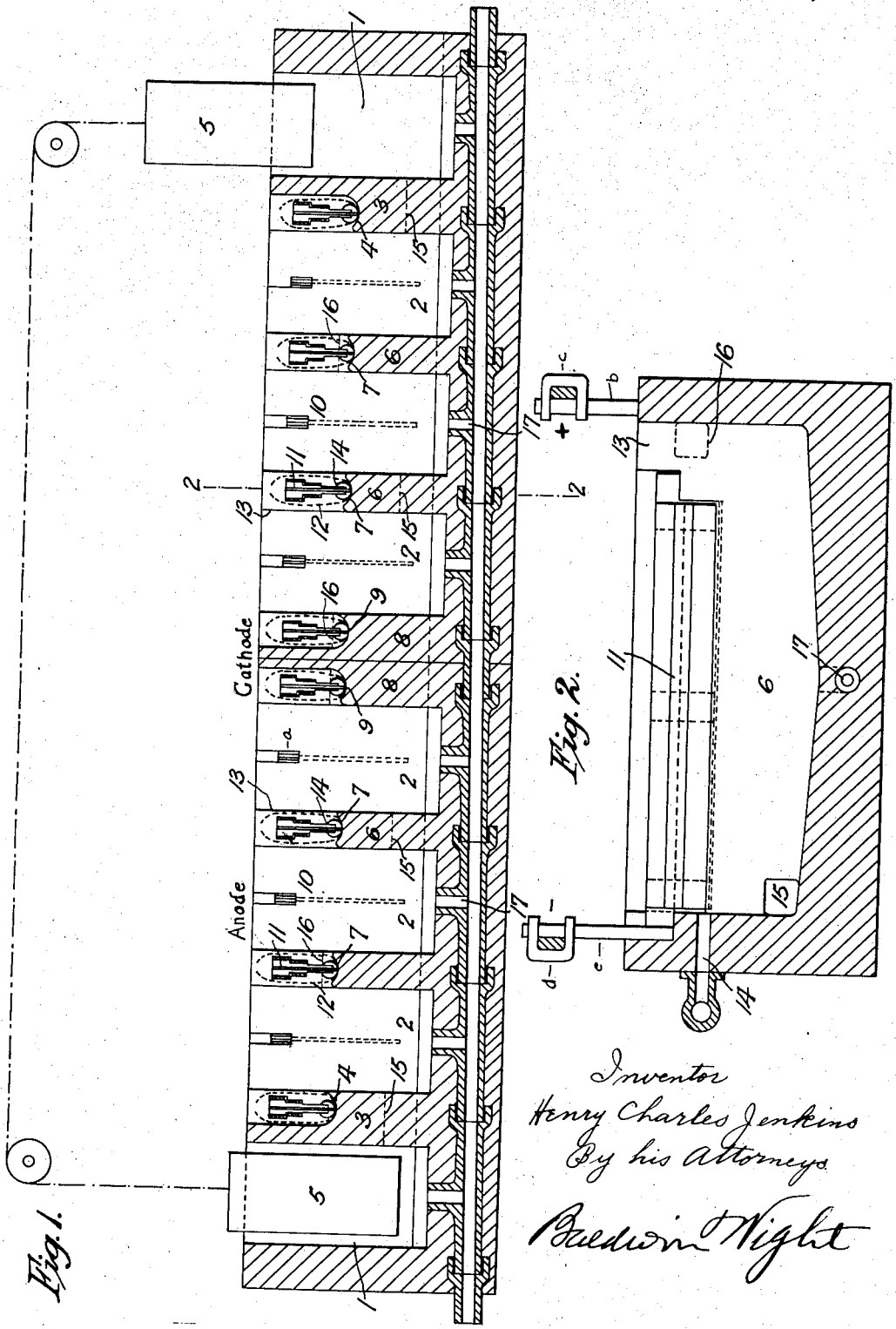

HENRY CHARLES JENKINS, OF LONDON, ENGLAND.

ELECTROLYTIC CELL.

1,335,338.  Specification of Letters Patent.  Patented Mar. 30, 1920.

Application filed September 3, 1919. Serial No. 321,433.

*To all whom it may concern:*

Be it known that I, HENRY CHARLES JENKINS, a subject of the King of Great Britain, residing at 815-817, Salisbury House, London, England, have invented new and useful Improvements in Electrolytic Cells, of which the following is a specification.

This invention relates to improvements in electrolytic cells for carrying out oxidation or reduction processes of the type which have electrodes of which one is contained in a porous covering (such as a bag) or a perforated protection (such as a box). The invention has mainly for its object to promote uniform circulation of the electrolyte in the region of the exposed electrode but to hinder circulation in the region of the protected electrode.

The cell is of the type having a plurality of active compartments divided by dwarf partitions the flow of the main electrolyte being parallel to the electrodes and according to this invention the protected electrodes are so arranged that the bottom of their coverings or protections are adjacent to the upper surfaces of the partitions.

To shield the protected electrodes from the flow of the main electrolyte their coverings are not so wide as the partitions and to hinder flow of the electrolyte over the partitions as also to allow the easy withdrawal of the catholyte the upper surfaces of the partitions are recessed; the secondary electrolyte from the coverings or protections collects in the recesses and can be drawn off therefrom without removing the electrodes; by providing draw-off passages at the bottom of the compartments both the anolyte and the catholyte can be drawn off simultaneously.

The end protected electrodes are placed in recesses formed in the end walls.

The anolyte and catholyte are drawn off simultaneously without removal of the protected electrodes; for this purpose the bottom of the cell chambers, preferably immediately beneath the exposed electrode, is connected with a draw-off passage while the bottoms of recesses cut in the walls and partitions lead to outlet passages.

The invention is illustrated in the accompanying drawings in which Figure 1 is a longitudinal section of an electrolytic cell having several active compartments. Fig. 2 is a section on the line 2—2 of Fig. 1.

Referring to the drawings 1, 1, are end chambers containing no electrodes and separated from the intermediate active chambers 2 by partitions 3 in which are formed recesses 4. 5 are displacers so connected together that one moves upward out of one chamber 1 while the other moves downward into the other chamber 1.

The active chambers 2 are separated by dwarf partitions 6 whose upper surfaces are provided with recesses 7 and in the middle by partitions 8 which rise to the top level of the cell in which are formed recesses 9.

10 are the anodes which may be of nickel and which extend from side to side of the cells, 11 are the cathodes that may be of iron or other suitable material according to the electrolyte to be treated, surrounded by porous bags 12 of asbestos cloth (not shown in Fig. 2) and arranged in the recesses 4 and 9 of the partitions 3 and 8 and resting on the recesses 7 of the dwarf partitions 6. The cathodes do not extend quite across the cell but as indicated in Fig. 2 the dwarf partitions are provided with extensions 13 on one side of the cell which come up to the top level of the cell.

All the recesses 4, 7 and 9 connect with outlet passages 14 through which the catholyte can be drawn off without the removal of the cathodes and all these passages may be simultaneously connected together so that the contents of the bags can be withdrawn.

All the chambers communicate together through the passages 15 and 16, one set of passages 15 being situated near to the bottom and at one side of the cell while the other set of passages 16 are situated at a higher level and on the other side of the cells and are formed in the extensions 13 of the dwarf partitions and in the partitions 8.

The main electrolyte will circulate from side to side of the cell alternately upward and downward, the cathode bags resting on the recesses 7 of the dwarf partitions hindering the flow of the electrolyte over such partitions; moreover a flow of liquid is definitely caused along the surfaces of the electrode and the surfaces of the bags that does not impinge in any way upon the bags, thus circulation through the substance of the bag is avoided.

17 are the draw-off passages situated vertically below the anodes 10.

Each anode 10 is held in a clamp *a* forming part of the electrode as indicated in Fig. 1. Each clamp terminates in an iron tang *b* connected to a + bus bar *c*. Each cathode 11 is connected to a — bus bar *d* by means of a tang *e*.

The cell hereinbefore described and shown in the drawings, is especially designed for oxidizing sodium manganate to permanganate in which case the anodes are made of nickel and the cathodes of iron, but the materials of which the anodes and cathodes are made will differ according to the material treated.

What I claim is:—

1. In an electrolytic cell, the combination of a plurality of active compartments separated by a dwarf partition, an exposed electrode in each compartment, and a protected electrode the bottom of whose protection is adjacent to the upper surfaces of the partition.

2. In an electrolytic cell, the combination of a plurality of active compartments separated by a dwarf partition, a recess on the upper surface of the partition, an exposed electrode in each compartment and a protected electrode the bottom of whose protection is adjacent to the upper surfaces of the partition.

3. In an electrolytic cell, the combination of a plurality of active compartments separated by a dwarf partition, a recess on the upper surface of the partition, an outlet passage in connection with such recess, an exposed electrode in each compartment, and a protected electrode the bottom of whose protection is adjacent to the upper surfaces of the partition.

4. In an electrolytic cell, the combination of a plurality of active compartments separated by a dwarf partition, a recess on the upper surface of the partition, an outlet passage in connection with such recess, an exposed electrode in each compartment, a protected electrode the bottom of whose protection is adjacent to the upper surfaces of the partition, and outlet passages from the bottoms of the cells.

5. In an electrolytic cell, the combination of a plurality of active compartments separated by a dwarf partition, an exposed electrode in each compartment, a protected electrode the bottom of whose protection is adjacent to the upper surfaces of the partition, and means for causing a flow of main electrolyte lengthwise of the electrodes.

6. In an electrolytic cell, the combination of a plurality of active compartments separated by a dwarf partition, a recess on the upper surface of the partition, an exposed electrode in each compartment, a protected electrode the bottom of whose protection rests in such recess, and means for causing a flow of main electrolyte lengthwise of the electrodes.

HENRY CHARLES JENKINS.